United States Patent Office 3,211,239
Patented Oct. 12, 1965

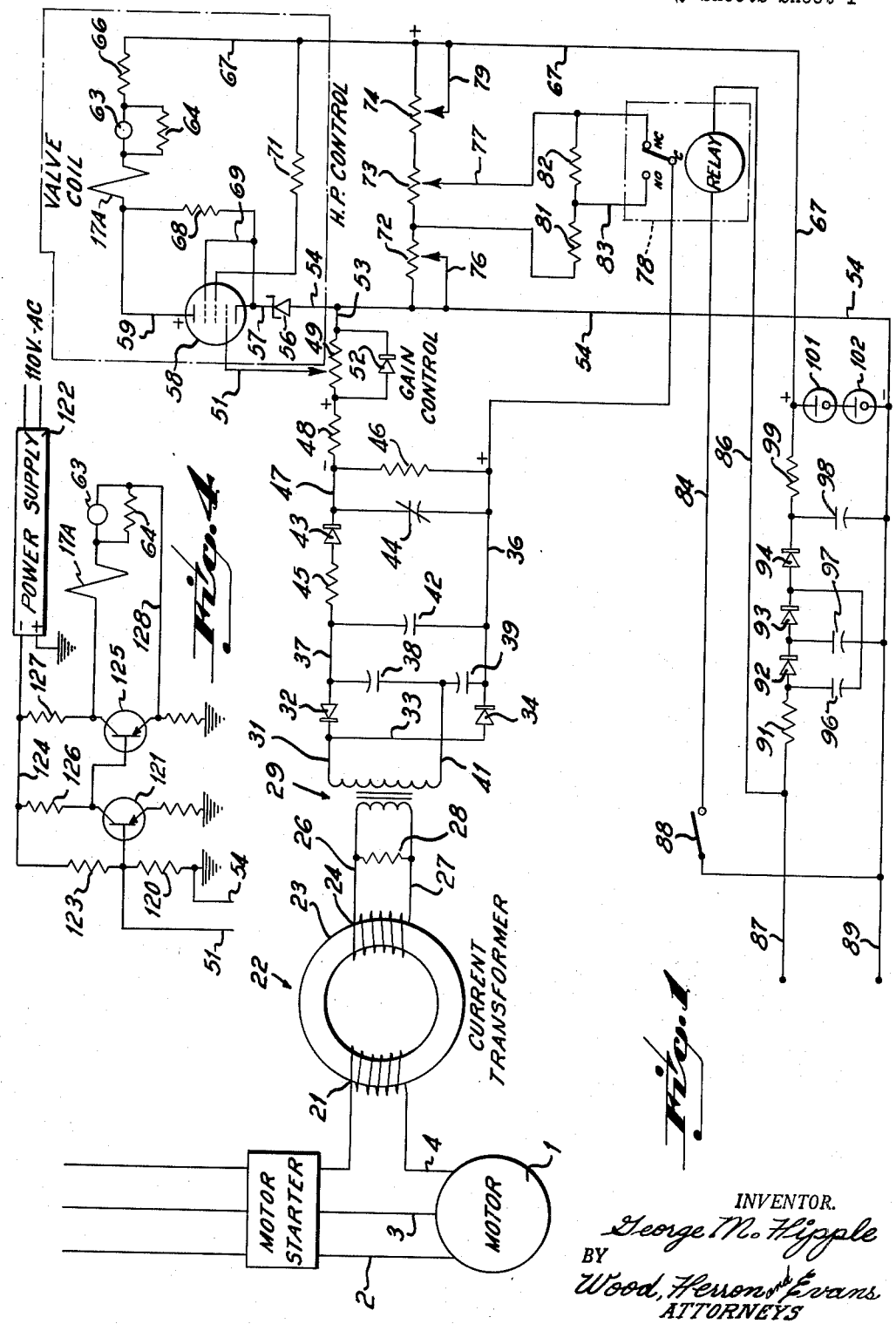

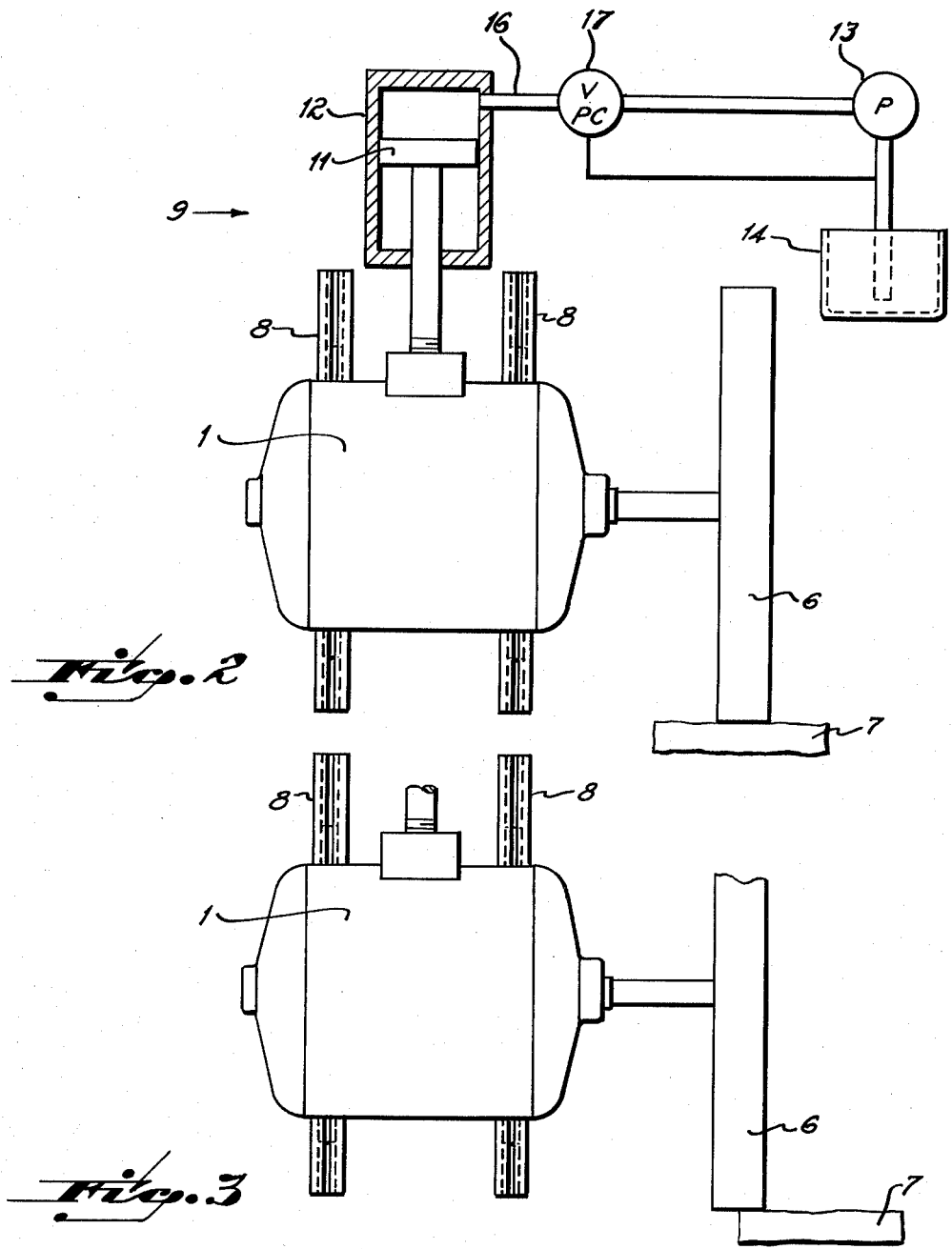

3,211,239
MOTOR HORSEPOWER CONTROL
George M. Hipple, Columbus, Ohio, assignor to American Brake Shoe Company, New York, N.Y., a corporation of Delaware
Filed Dec. 21, 1961, Ser. No. 160,998
9 Claims. (Cl. 173—7)

This invention relates to means for regulating the horsepower developed by an electric motor under changing work conditions. More particularly, the invention is directed to means for varying the mechanical load on an electric motor in accordance with changing power requirements established by the characteristics of the load, so that the power delivered by the motor will be maintained substantially constant.

The invention is subject to many applications. In the metal working field, for example, it is frequently desirable, in grinding, boring, turning and other operations in which the load imposed on the electric motor driving the tool tends to be uneven, to regulate or stabilize the horsepower developed by the motor. Because of some physical or metallurgical irregularity in the work piece, the load on the motor may be suddenly and sharply increased or decreased, and it is desirable to compensate for such irregularities so that the motor load will be uniform, whereby the motor will neither be electrically overloaded nor underloaded regardless of variations in the mechanical load. Thus, for example, a cutting tool is sometimes simply manually backed off from a work piece by some arbitrary amount to compensate roughly for irregularities such as soft and/or hard spots in the work piece.

Considerations of cutting efficiency, tool life, or other reasons make it desirable to hold motor power output more exactly constant, so that a substantially constant load is imposed on the motor. Obviously, merely arbitrarily changing the position of the tool or grinder with respect to the work piece will not usually compensate in a manner holding the motor power output constant; compensation by an arbitrary amount may be too little or too great, and the motor will not usually run at preselected optimum conditions for the particular operation.

One particular example of a practical situation in which it is desirable that motor power output be kept constant as work is performed on a work piece of non-uniform character, is in the removal of scale from stainless steel billets. Stainless steel slabs or billets have a surface layer of scale which forms during their production. These slabs or billets are conventionally subjected to a grinding operation with a surface grider to remove the scale and prepare them for further treatment. The thickness and toughness of the layer of scale may vary widely over the surface of the billet and normally causes wide variations in the motor power required to turn the grinding wheel. The scale can be removed most rapidly, and at greatest efficiency of motor operation, if the motor power output is held substantially constant at a properly selected valve.

The present invention is directed to means whereby this objective may be achieved, both in connection with grinding operations and in other instances where a similar objective is desired.

The load imposed on the motor may depend upon the force with which the motor driven member, whether it is a cutter, grinder, or other shaping tool, is held against the material being machined. Or, the load may depend on the force exerted on a stationary cutting tool by a moving piece of material being machined, or further, the load on the motor may be determined by the feed pressure between a moving cutter and a moving piece of material being machined. This invention is specifically directed to installations wherein the force with which the relatively moving members are held together is supplied hydraulically, for example, by a hydraulic motor, which is preferably, but not necessarily, a ram, the applied pressure of hydraulic fluid on which determines the force on the ram and on the relatively moving members, and which thereby determines the load on the motor.

The invention includes an electrically operated pressure control device which regulates the pressure of fluid applied to the ram piston in accordance with the magnitude of an electrical input supplied to an electromechanical transducer in the device.

In accordance with this invention, a change in motor load is sensed electrically and is reflected as a corresponding or proportionate inverse change in the force supplied by the ram, so that when, for example, motor load starts to increase because of an irregularity in the load, the force delivered by the ram holding the relatively moving members together, for example, holding a grinding wheel against a work piece, is reduced, reducing motor load by an amount sufficient to maintain motor power output substantially constant. More specifically, the sensed change in motor power effects a change in the electrical input supplied to the pressure control device, so that the pressure of the hydraulic fluid which supplies the force holding the relatively rotating elements together is changed as the motor power changes in a manner counterbalancing the incipient change in motor power.

The invention can best be further described by reference to the accompanying drawing in which:

FIGURE 1 is a circuit diagram of a preferred embodiment of a motor horsepower control in accordance with this invention;

FIGURE 2 is a schematic diagram of a grinding machine for removing scale from a billet of metal, wherein the grinding wheel is held against the work piece by force supplied by a hydraulic ram;

FIGURE 3 is a schematic diagram similar to FIGURE 2 but shows the relation of the grinding wheel to the work piece as a first cut is taken along the edge of the billet; and FIGURE 4 is a diagram of a solid state amplifier which may be substituted for the amplifier shown within dot-dash lines in FIGURE 1.

The circuit shown in FIGURE 1 controls the horsepower of an electric motor which is indicated diagrammatically at 1. The motor 1 shown is a three-phase motor, since the usually the circuit will be used with motors of that type, but it may be a single phase motor.

The motor is energized through leads 2, 3, and 4 connected to a conventional source of power not shown, which supplies a substantially constant A.C. voltage. As is known to those skilled in this art, for any given horsepower developed by an electric motor there is a corresponding fixed electric line current value for any specified line voltage. The means which I have invented regulates the horsepower developed by the motor by constantly sensing the current drawn by the motor; as motor current begins to increase, as would be the case if the motor load were increased, causing horsepower to rise, the sensed change in current is reflected through an electrical circuit as a reduction in the physical load applied to the motor, by reducing the force with which the driven member moved by the motor, whatever its nature, is held against the object on which it is performing work, so that the load on the motor will be reduced, therby also establishing a reduction in the current drawn by the motor, and maintaining motor horsepower substantially constant. If the load on the motor begins to decrease, the motor will reflect this by drawing less current and developing less power. This reduction in motor current is sensed by the circuit, and the circuit will cause the load on the motor to be increased, by causing the member driven by the motor to be held more tightly against the work piece, so that motor current increases to the previous magnitude.

As previously indicated, the motor 1 may drive a grinding wheel, and in FIGURES 2 and 3 and in the following description it will be assumed that this is the case for purposes of explanation, although it will be appreciated that the invention is not limited to such use alone.

As is shown in FIGURES 2 and 3, the motor 1 drives a grinding wheel 6 which is used to remove scale from a metal billet 7. The billet is advanced toward the wheel 7 (i.e., into the plane of the drawing) at a constant rate by conventional means not shown, and is moved laterally between cuts by other suitable means not shown.

The motor is mounted for vertical movement on ways 8, and is positioned therealong by a hydraulically operated reciprocating motor or ram 9. The ram 9 includes a piston 11 in a hydraulic cylinder 12, the pressure of hydraulic fluid in which controls the force with which the grinding wheel 6 is held against the billet 7.

Fluid under pressure is supplied to the cylinder 12 from a conventional source such as a pump 13 which is supplied with fluid from a reservoir or tank 14. Fluid is supplied from the pump 13 to the cylinder 12 through a line 16 which includes an electrically operated pressure control valve 17.

The valve 17 maintains the pressure in line 16 in relation to the magnitude of an electric signal supplied to it. A preferred pressure control valve of the type illustrated diagrammatically at 17 is described in detail in the co-pending application of Cecil E. Adams et al., Serial No. 855,629, entitled "Electric and Fluid Pressure Operated Valve Mechanism," filed November 27, 1958, now abandoned to which reference is hereby made. In the valve of that application, the pressure supplied through the valve is proportional to and controlled by the magnitude of an electrical current which is supplied to an electromagnetic transducer element of the valve. While the valve of the Adams application constitutes a preferred pressure control device for this invention, other devices which regulate fluid pressure in accordance with an electric input can be used, and are therefore included within the compass of the invention.

With reference to the particular system shown in FIGURE 2, if a surface irregularity such as a soft spot in the billet 7 causes an increase in the load on the motor and in motor power output, the change in power is sensed, in a manner to be described, and is reflected in the electrical input supplied to valve 17 so that the valve is caused to reduce the pressure in line 16 and cylinder 12 so that the hydraulic force on the ram 9 is reduced by an amount sufficient to permit the grinder to travel across the irregularity while maintaining a constant motor power output. It should be pointed out here that in the grinding machine shown for purposes of illustration, the grinding wheel 6 is operated to remove scale at the fastest rate possible without burning the billet, and that the smoothness or levelness of the surface of billet 7 is not important. The pressure in cylinder 12 is regulated to hold the wheel 6 against the billet with a force which is varied to hold motor power output constant, regardless of surface irregularities in the billets 7.

As shown in FIGURE 1, motor lead 4 is connected to the primary winding 21 of a current transformer 22. This transformer 22 includes an iron core 23 and has a secondary winding 24. The current developed in the secondary 24 will be proportionately less, by the turns ratio, than the current in the transformer primary 21. As an example, where the motor 1 has a horsepower rating of 40 horsepower, the primary winding may be of 8 turns and the secondary winding of 400 turns, and the secondary current will be about 2% of the primary current. The resistance of the primary 21 is low and the inclusion of the primary in the motor circuit does not substantially reduce the motor voltage or current in leads 2, 3, and 4.

The leads 26 and 27 of transformer secondary winding 24 are shunted by a resistor 28 and are connected to the primary winding of a voltage step-up transformer indicated at 29. Lead 31 of the secondary winding of voltage transformer 29 is connected to the positive side of a diode 32. Lead 31 is connected through a lead 33 to the negative side of a diode 34, the positive side of which is connected to a lead 36. The negative side of the diode 32 is connected to a lead 37. A pair of series connected capacitors 38 and 39 are connected between leads 36 and 37, secondary lead 41 of voltage transformer 29 being connected between capacitors 38 and 49. A filter condenser 42 is connected in parallel with condensors 38 and 39 between leads 36 and 37.

Lead 37 is connected to one end of a resistor 45, the other end of which is connected to the negative side of a diode 43. The positive side of diode 43 is connected to lead 36 through a variable condensor 44, and a resistor 46 is connected in parallel with variable capacitor 44 between lead 36 and lead 47 which is connected to the positive side of diode 43. Lead 47 is connected to a pair of series connected resistors 48 and 49, resistor 49 being a variable resistor having a tap 51. A diode 52 is connected across resistor 49, the negative side of diode 52 being connected between resistors 48 and 49, and its positive side being connected at the other side of resisitor 49 to a lead 53.

Lead 53 is connected to a lead 54 which is connected to the negative side of a Zener diode 56. The positive side of diode 56 is connected through a lead 57 to the cathode of a pentode 58. The control grid of pentode 58 is connected to the tap 51 of variable resistor 49. The plate of pentode 58 is connected to a lead 59, which is connected to one side of the coil 17A of valve 17 (see FIGURE 2). With reference to the previously identified Adams application Serial No. 855,629, lead 59 is connected to one of the leads of the valve coil which is designated as 43 in the drawings of that application. The other valve coil lead is connected to a parallel connected thermistor 63 (which corresponds to element 44 of the structure disclosed in the Adams application) and thermistor shunt resistor 64, which together function to stabilize the resistance of the valve coil with temperature. The common or connected side of thermistor 63 and resistor 64 is connected to a resistor 66, the other side of which is connected to a lead 67.

A by-pass resistor 68 is connected from lead 57 to plate lead 59, lead 57 also being connected to the suppressor grid of tube 58 through a lead 69. The screen grid of tube 58 is connected through a resistor 71 to a lead 67.

Three variable resistors 72, 73, and 74 are connected in series between leads 54 and 67. Resistor 72 has a tap 76 which is connected to lead 54. The tap 77 of resistor 73 is connected to the normally closed pole of a relay which is designated generally by 78. The tap 79 of resistor 74 is connected to lead 67. A pair of resistors 81 and 82 are connected between the junction of resistors 72 and 73 and the tap lead 77 of resistor 73. The normally open contact of relay 78 is connected between resistors 81 and 82 by a lead 83, and the common pole or contact of relay 78 is connected to lead 36. The coil leads of relay 78 are designated by 84 and 86. Coil lead 86 is connected to a line lead 87, and coil lead 84 is connected through a switch 88 to a line lead 89. Line leads 87 and 89 are connectable to a conventional source of alternating current not shown.

Line lead 87 is connected to one side of a resistor 91, the other side of which is connected to the positive side of a diode 92. Diode 92 is connected in series relation with two similar diodes 93 and 94. A capacitor 98 is connected between the positive side of diode 94 and line lead 89. A resistor 99 is connected between the negative side of diode 94 and the plate of a voltage regulator tube 101 and to lead 67. The cathode of voltage regulator tube 101 is connected to the plate of a second voltage regulator tube 102, the cathode of which is connected to line lead 89 and to lead 54.

The operation of the circuit shown in FIGURE 1 may now be described. When the current drawn by the motor in line 4 changes, in response to a change in motor load and motor horsepower output, that current change is reflected as a proportional current change in the secondary winding 24 of current transformer 22. The current in the secondary winding of the transformer 22 establishes a voltage drop across resistor 28, which is proportional to the current in the motor lead 4.

The voltage drop across resistor 28 is applied across the winding of voltage transformer 29, and appears stepped up in the secondary winding of that transformer between leads 31 and 41. The stepped up voltage between leads 31 and 41 is rectified and doubled by the circuit comprising diodes 32 and 34 and capacitors 38 and 39. Capacitor 42 filters the output voltage. Thus, A.C. current changes in the motor 1 are reflected as proportionate changes in the D.C. voltage between leads 36 and 37.

The voltage between leads 36 and 37 is preferably applied across an integrating circuit which includes diode 43 and variable capacitor 44. These circuit elements superimpose on the voltage between leads 36 and 47 a voltage which is proportional to the time integral of the motor current. The potential difference between leads 36 and 47 is thus the algebraic sum of a D.C. voltage component which is proportional to the magnitude of the current in primary winding 21 and a component which is proportional to the time integral of that current. The relative magnitude of the integrated voltage factor is adjusted by the setting of variable capacitor 44.

The input signal between leads 36 and 47 is compared to a preset reference voltage the magnitude of which will correspond proportionally with that current value which the motor 1 will require to produce a predetermined horsepower and which reference voltage is determined by the setting of the variable resistors 72, 73 and 74. That is, the motor power signal voltage between leads 36 and 47 is added algebraically to the above mentioned reference or comparison voltage which is established in the circuit comprising lead 36, the normally closed pole NC of relay 78, tap 77 of resistor 73, resistor 72, and lead 53. All or a part of the algebraic sum of these two voltages is divided off by the tap 51 of resistor 49 which is connected to the grid of tube 58.

A regulated D.C. potential is impressed between leads 54 and 67 by the power supply comprised by circuit elements 91 to 102. This power supply may be conventional, but preferably includes a voltage tripler circuit including diodes 92 through 94 and capacitors 96 through 98. The voltage between leads 54 and 67 is regulated by the pair of series connected voltage regulator tubes 101 and 102, lead 67 being positive with respect to lead 54.

Zener diode 56, which is connected between leads 54 and 59 through resistor 68, establishes a fixed potential drop between lead 54 and lead 57 which is connected to the cathode of tube 58, since current can flow between leads 54 and 59 through resistor 68 even when the tube 58 is cut off. The grid-cathode voltage of tube 58 is thus comprised of the fixed bias voltage produced across Zener diode 56 plus a part or all of the sum of the fixed reference voltage and the motor current input signal. The diode 52 prevents tap lead 51 from becoming positive when the motor input signal is less than the positive reference voltage, thereby preventing grid current.

As the motor current in power line 4 increases, the potential of tap 51, which is applied to the grid of tube 58, relative to the potential of the cathode of tube 58, becomes increasingly negative, causing the plate current to be reduced, thereby reducing the current applied to the valve coil 17A of valve 17. A reduction in the current flowing in the valve coil 17A causes the valve 17 (FIGURE 2) to reduce the hydraulic pressure in the line 16 in which it is connected, causing less downward force to be applied to the grinding wheel 6 and reducing the load on the motor 1. The manner in which valve pressure setting changes with coil current is more fully described in previously mentioned Adams application Serial No. 855,629.

The value of resistor 66, which is connected in series with the valve coil 17A, is selected to establish the desired maximum current which will flow in the valve coil 17A when the tube 58 is cut off. As previously explained, parallel connected thermistor 63 and thermistor shunt resistor 64 in combination compensate for resistance changes of the valve coil element 17A due to changes in the temperature thereof.

The substantially constant horsepower which the motor 1 is required to develop is determined by the setting of variable resistor 73, labeled "H.P. control" in FIGURE 1. In principle, resistors 72 and 74, which are connected in series with resistor 73, might be omitted, resistor 73 being connected directly between leads 54 and 67, but in practice it is preferred that they be included so that calibration markings of resistor 73 can be directly correlated to motor horsepower. When tap 77 is moved to the left on resistor 73, the magnitude of the previously referred to preset reference voltage is reduced, and the smaller this voltage, the more negative the sum of this voltage and the applied motor current signal between leads 36 and 47 becomes. Therefore, the plate current of tube 58, which flows in the valve coil 17A, is reduced and the value of the horsepower at which the motor 1 will become stabilized is reduced. Correspondingly, moving tap 77 to the right on resistor 73 will increase the horsepower setting at which motor operation will stabilize.

In actual tests I have found that by means of the circuit shown in FIGURE 1 motor horsepower may be maintained within plus or minus 3% of a preselected value. The system may tend to fluctuate about the selected horsepower value within the plus or minus 3% range, and in so doing supplies a current to the valve coil 17A which is modulated by incipient changes in motor horsepower demands. I have found that the integrating circuit comprised of capacitor 44 and diode 43 is highly effective to stabilize the operation of the system, and by varying the setting of variable capacitor 44 it is possible to adjust the stability of the system so that under given operating conditions it will operate very smoothly and quickly in response to incipient horsepower changes of the motor 1. In this connection, resistor 49 functions as a gain control whereby the gain or sensitivity of the circuit may be regulated, too much gain tending to cause instability of operation.

Normally switch 88 in lead 84 of the coil of relay 78 is open, and the armature of relay 78 is connected to the normally closed contact so that lead 36 is connected directly to tap 77 of resistor 73. The function of this relay, and of resistors 81 and 82, is to provide means for properly controlling the motor power output when only a fraction of the width of the grinding wheel 6 is in contact with the billet 7. This situation is illustrated in FIGURE 3 of the drawings. At the beginning of the operation of grinding scale from the billet, an initial edge cut is usually taken in which about half the width of the wheel 6 is in contact with the billet 7. Under these conditions, if the horsepower of the motor were maintained at the same value as when the entire width of the wheel 6 is performing work on the billet 7, it will be apparent that a load twice as great as the normal load would be applied to the actual surface area of the grinding wheel which is in contact with the work, causing severe overheating of the billet accompanied by burning thereof. It is therefore desirable, during the initial edge cut, to reduce the horsepower of the motor to a fraction corresponding to the fraction of the width of the grinding wheel which is in contact with the billet. Thus, if one-half the width of the wheel is engaged with the billet during this cut, the motor horsepower should be set at half its normal value. This could of course be done simply by manually changing the setting of tap 77 on horsepower control resistor 73, but it is convenient to effect the reduction without changing the setting of tap 77, since the motor will thereafter be run at the regular power setting. For this reason relay 78 is included in the circuit. Simply by closing switch 88 the coil of relay 78 is energized, so that its armature is connected to the normally open contact NO and lead 83. If the resistances of resistors 81 and 82 are equal, as is preferred, the magnitude of the reference voltage between leads 36 and 54 will be reduced to half of its normal value, thereby reducing the horsepower setting of the motor to one half of its normal value. At the end of the initial edge cut, switch 88 is opened, de-energizing the coil of relay 78 and switching the motor to its normal horsepower setting. It will be appreciated that this portion of the circuit of FIGURE 1 is not a necessary part of the invention but is desirable in some circumstances.

Preferred parameters of the circuit elements shown in FIGURE 1 are as follows: resistor 28, 10 ohms; capacitors 38 and 39, 0.5 mfd.; capacitor 42, 1 mfd.; variable capacitor 44, 5-50 mfd.; resistor 45, 10K ohms; resistor 46, 10K ohms; resistor 48, 1 megohm; variable resistor 49, 1 megohm; tube 58 is a 6CZ5 pentode; resistor 68, 33K ohms; resistor 66, 1K ohm; resistor 71, 82K ohms; and Zener diode 56 is a 12 volt diode. Variable resistor 72 is of 250K ohms; variable resistor 73, 100K ohms; variable resistor 74, 500K ohms; resistors 81 and 82 are 500K ohms. In the preferred power supply circuit which is shown, resistor 91 is a 47 ohm resistor; capacitors 96 and 97 are 20 mfd.; capacitor 98 is a 20 mfd. capacitor having a 450 volt rating; resistor 99, 4500 ohms, and the voltage regulator tubes 101 and 102 are type OB2 tubes which establish a regulated potential difference of 210 volts D.C. between leads 54 and 67.

It may be desired to substitute a solid state amplifier for the amplifier including pentode 58. FIGURE 4 of the drawings shows circuitry by which this may be accomplished. If the circuitry of FIGURE 4 is employed, it is substituted for that circuitry in the upper right-hand corner of FIGURE 1 which is enclosed by the broken line rectangle.

As shown in FIGURE 4, the tap 51 is connected to one side of a resistor 120 the other side of which is connected to line 54 and to ground. Tap 51 is also connected to the base of a PNP type transistor 121 and to the negative terminal of a regulated voltage supply 122 through a resistor 123 and a lead line 124. The positive output terminal of power supply 122 is connected to ground. The collector of transistor 121 is connected to the base of a second PNP type transistor 125 and to the lead line 124 through a resistor 126. The collector of transistor 125 is connected directly to the coil 17A of valve 17 and to lead line 124 through a resistor 127. A lead line 128 connects the thermistor 63 and thermistor shunt resistor 64 to the emitter of transistor 125 and the emitters of both transistor 121 and 125 are connected to ground through resistors all as clearly shown in the drawing.

The substitution of the above described circuitry of FIGURE 4 in the circuit of FIGURE 1 does not change the operation of the FIGURE 1 from that previously described herein.

From the foregoing, it will be seen that the horsepower control or system means which I have invented broadly includes an electrically operated hydraulic pressure control device of the type which regulates pressure in accordance with the magnitude of an electrical input supplied to it, means sensing the instaneous power being developed by the motor, an electric circuit supplying a electrical input to the electrically operated pressure control device.

What is claimed is:

1. A system comprising, an electrically operated hydraulic pressure control valve having a valve coil, said valve being of the type which controls hydraulic pressure in accordance with a direct current applied to the valve coil, a hydraulic motor operated by pressure controlled by said valve, an electric motor operating against a load imposed by said hydraulic motor, the power developed by said electric motor varying with the pressure controlled by said valve, and electric circuit means continuously sensing the current drawn by said electric motor in developing said power and supplying a direct current to said valve coil the magnitude of which direct current varies in inverse proportion of the current drawn by said electric motor and sensed by said circuit means, whereby said electrically operated pressure control valve regulates hydraulic pressure oppositely as the power developed by said electric motor changes.

2. A system comprising, an electrically operated hydraulic pressure control valve having a valve coil, said valve being of the type which controls hydraulic pressure in accordance with the magnitude of a direct current applied to the valve coil, a hydraulic motor, a pressure supply for said hydraulic motor, said valve controlling pressure supplied to operate said hydraulic motor, an electric motor for doing work against the force of said hydraulic motor, the power developed by said electric motor varying with the pressure of the fluid supplied to said hydraulic motor as controlled by said pressure control valve, electric circuit means including a current transformer for establishing a current signal proportional to the current drawn by said electric motor, circuit means converting said current signal into a voltage signal which is proportional to said current signal, power supply means connected to supply a direct current to said valve coil, and means regulating the magnitude of the current supplied to said valve coil by said power supply means inversely in accordance with the magnitude of said voltage signal, whereby the current supplied to said valve coil is increased as the current drawn by said electric motor decreases.

3. A system comprising, an electrically operated hydraulic pressure control valve having a valve coil, said valve being of the type which controls hydraulic pressure in accordance with a direct current applied to the valve coil, a hydraulic motor operated by pressure controlled by said valve, an electric motor operating against the force of said hydraulic motor, the power developed by said electric motor varying with the pressure established by said valve, electric circuit means for continuously sensing the current drawn by said electric motor in developing said power and establishing a signal proportional to the current drawn by said electric motor, circuit means amplifying said signal and supplying a D.C. potential proportional to the magnitude of said signal, power supply means connected to supply a direct current to said valve coil, said power supply means including a vacuum tube the grid potential of which is controlled by said D.C. potential in such manner that the current supplied to said valve coil is increased as the current drawn by said electric motor decreases.

4. A system comprising, an electrically operated hydraulic pressure control valve having a valve coil, said valve being of the type which controls hydraulic pressure in accordance with a direct current applied to the valve coil, a hydraulic motor operated by pressure controlled by said valve, an electric motor operating against the force of said hydraulic motor, the power developed by said electric motor varying with the pressure established by said valve, electric circuit means for continuously sensing the current drawn by said electric motor and establishing a signal proportional thereto, circuit means amplifying said signal and supplying a D.C. potential proportional to the magnitude of said signal, means superimposing on said D.C. potential a D.C. voltage which is proportional to the integral of the current drawn by said electric motor, power supply means connected to supply a direct current to said pressure control valve, said power supply means including a vacuum tube in circuit connection with said valve coil, the grid potential of said tube being controlled by the sum of said D.C. potential and said D.C. voltage so that the current supplied to said valve coil is increased as the current drawn by said electric motor decreases.

5. The combination of an electrically operated hydraulic pressure control valve having a valve coil, said valve being of the type which controls hydraulic pressure in accordance with the magnitude of a direct current applied to the valve coil, a hydraulic motor operated by fluid pressure controlled by said valve, an electric motor operating against the force of said hydraulic motor, the power developed by the electric motor varying with the pressure controlled by said valve, a current transformer connected to said electric motor for establishing a current signal proportional to the current drawn by said electric motor, circuit means amplifying said signal and supplying a D.C. potential proportional to the magnitude of said signal, means superimposing on said D.C. potential a D.C. voltage which is proportional to the integral of the current drawn by said electric motor, power supply means connected to supply a direct current to said electrically operated pressure control valve, said power supply means including a vacuum tube in circuit connection with said valve coil, the grid potential of said tube being controlled by the sum of said D.C. potential and said D.C. voltage so that the current supplied to said valve coil is increased as the current drawn by said electric motor decreases.

6. A system comprising, an electrically operated hydraulic pressure control valve having a valve coil, said valve being of the type which controls hydraulic pressure in accordance with a direct current applied to the valve coil, a hydraulic motor operated by pressure controlled by said valve, an electric motor operating against the force of said hydraulic motor, the power developed by said electric motor varying with the pressure established by said valve, a current transformer connected to said electric motor for establishing a current signal proportional to the current drawn by said electric motor, circuit means amplifying said signal and supplying a D.C. potential proportional to the magnitude of said signal, means superimposing on said D.C. potential a D.C. voltage which is proportional to the integral of the current drawn by said electric motor, power supply means connected to supply a direct current to said valve coil, the current supplied to said valve coil being determined by the sum of said D.C. potential and said D.C. voltage so that the current supplied to said valve coil is varied as the current drawn by said electric motor changes to maintain the power developed by said electric motor substantially at a pre-established value.

7. A system comprising an electrically operated hydraulic pressure control valve having a valve coil, said valve being of the type which controls hydraulic pressure in accordance with the magnitude of a direct current applied to the valve coil, a hydraulic motor operated by pressure controlled by said valve, an electric motor for moving a driven member against a relatively stationary member, said hydraulic motor supplying a force for holding said members together, means sensing the current drawn by said electric motor in moving said driven member and supplying a D.C. voltage signal which is proportional to said current, a vacuum tube having a grid, cathode and plate, circuit means establishing a reference potential, circuit means oppositely superimposing said voltage signal on said reference potential and applying a voltage related to the sum thereof between said grid and cathode, said valve coil being electrically connected to the plate of said tube, and power supply means establishing a potential difference between said cathode and plate whereby the current supplied to said valve coil is regulated in accordance with said D.C. signal.

8. A system comprising an electric motor arranged to rotate a driven member against a relatively stationary member, a hydraulic motor supplying force to hold said members together, the power output from said electric motor varying with the force, said members are held together by said hydraulic motor, a current transformer connected to said motor for sensing the current drawn by said motor in rotating said driven member, said transformer establishing a current signal which is proportional to the current drawn by said motor, a means converting said current signal to a D.C. voltage signal, a vacuum tube having a grid, cathode and plate, circuit means establishing a reference potential, circuit means oppositely superimposing said voltage signal on said reference potential and applying a voltage related to the sum thereof between said grid and cathode, an electrically operated hydraulic pressure control valve of the type wherein pressure is regulated in accordance with a direct current supplied to said valve, said valve controlling the pressure of operating fluid supplied to said hydraulic motor for holding said members together, said electrically operated pressure control valve being electrically connected to the plate of said tube, and power supply means establishing a potential difference between said cathode and plate, whereby the current supplied to said electrically operated pressure control valve is regulated in inverse relation to the current drawn by said motor.

9. A system comprising a driven member, a relatively stationary member, hydraulic pressure operated means supplying force holding said members together, an electric motor driving said driven member, means sensing the current drawn by said motor in driving said driven member and supplying a D.C. voltage signal which is proportional to said current, a transistor amplifier, circuit means establishing a reference potential, circuit means oppositely superimposing said voltage signal on said reference potential and applying a voltage related to the sum thereof to said amplifier to be amplified, an electrically operated hydraulic pressure control valve controlling the pressure of fluid supplied to operate said hydraulic means, said pressure control valve being of the type wherein pressure is regulated in accordance with a direct current supplied to said valve, said electrically operated valve being electrically connected to be operated by the amplified output of said amplifier, whereby the current supplied to said electrically operated valve is regulated in accordance with said D.C. signal.

References Cited by the Examiner
UNITED STATES PATENTS 2,331,123 10/43 Leigh _____ 318—433 X
2,728,041 12/55 Boundy et al. _____ 318—448 X
2,946,943 7/60 Nye et al. _____ 318—448

OTHER REFERENCES

Publication: D'Azzo & Houpis. Control System Analysis and Synthesis, New York, McGraw-Hill, 1960 pp. 268–269.

BROUGHTON G. DURHAM, *Primary Examiner.*

MILTON O. HIRSHFIELD, *Examiner.*